July 16, 1957   D. G. MAGILL   2,799,610
METHOD OF PRODUCING ADHESIVELY BONDED SEAM
Filed May 5, 1955
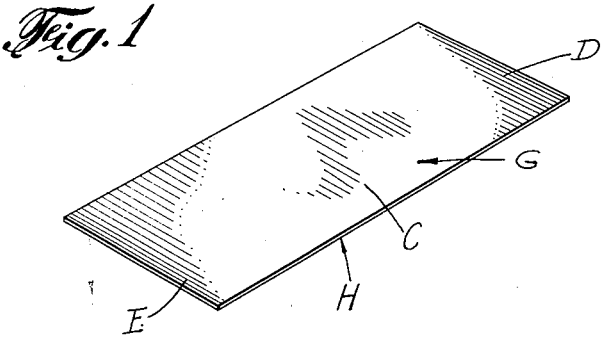
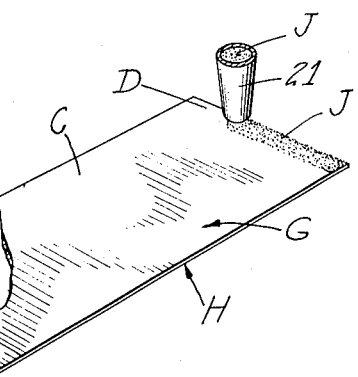
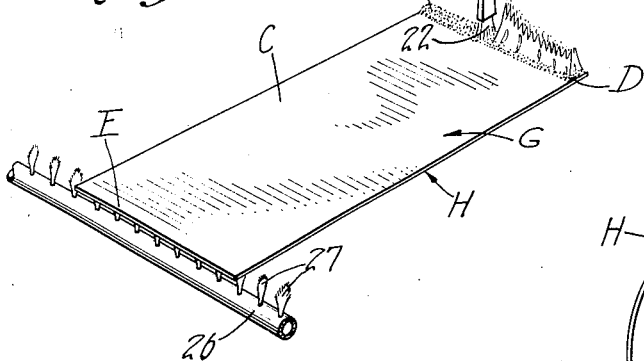
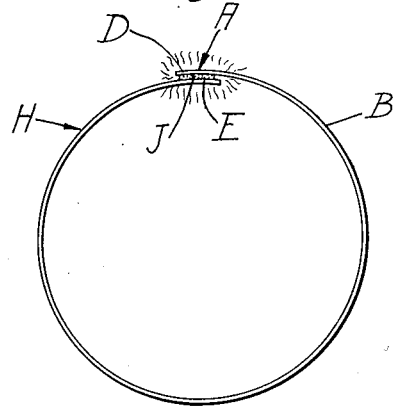
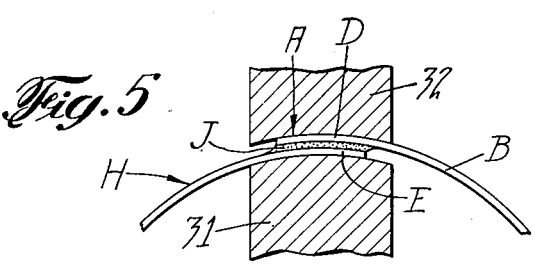
INVENTOR.
DONALD G. MAGILL
BY Charles H. Erne
Leland R. McCann
George W. Reiber
ATTORNEYS

United States Patent Office 2,799,610
Patented July 16, 1957

2,799,610

METHOD OF PRODUCING ADHESIVELY BONDED SEAM

Donald G. Magill, Great Neck, N. Y., assignor to American Can Company, New York, N. Y., a corporation of New Jersey Application May 5, 1955, Serial No. 506,104

6 Claims. (Cl. 154—116)

The present invention relates to a method of producing an adhesively bonded joint or seam between nonabsorbent surfaces of articles such as cans or containers or container parts and has particular reference to making a strong bond that is effective substantially instantaneously.

In producing adhesively bonded joints or seams such as for example the lapped side seams of cans or containers having nonabsorbent surfaces such as metal or metallic foil or plastic coated surfaces, considerable difficulty has been experienced in securing a strong bond between the seam parts under high speed production. Adhesives such as casein, polyvinyl acetate and the like produce a satisfactory bond but require considerable time, pressure and heat in order to obtain satisfactory adhesion. Especially is this the case in the manufacture of cylinders, such as the bodies of cans or containers where the lapped seam portions of the cylinder inherently tend to spring apart if not held under pressure for a sufficient period of time to permit the adhesive to set. This condition is further aggravated when nonabsorbent surfaces are to be bonded together because such surfaces when substantially in contact with the adhesive interposed between them, prevent the escape or absorption of solvents in the adhesive and this results in exceedingly slow setting of the adhesive. Under high speed production of cans and containers, in the range of 250 or more per minute, setting of the adhesive must be effected as fast as possible.

An object of the instant invention is the provision of a method of producing strong adhesively bonded joints or seams between nonabsorbent surfaces wherein setting of the adhesive upon pressing together the parts to be bonded is effected substantially instantaneously so that the joints or seams may be produced at exceedingly high speed.

Another object is the provision of such a method of producing joints or seams between nonabsorbent surfaces wherein a strong bond is produced to permanently hold the parts together.

Another object is the provision of such a method, the steps of which may be readily carried out in the regular course of producing can or container bodies on conventional automatic machinery.

Numerous other objects and advantages of the invention will be apparent as it is better understood from the following description, which, taken in connection with the accompanying drawings, discloses a preferred embodiment thereof.

Figure 1 is a perspective view of a can or container body blank, the side seam marginal edge portions of which are adapted to be permanently and adhesively secured together in accordance with the steps of the instant method invention to produce a cylindrical can or container body;

Fig. 2 is a perspective view of the blank shown in Fig. 1 with a portion of a nozzle for applying an adhesive to a marginal edge portion of the blank as a step in the method, a portion of the blank being broken away;

Fig. 3 is a perspective view of the blank shown in Fig. 1 together with apparatus for performing subsequent operations on the adhesive coated and the uncoated side seam marginal edge portions of the blank, parts being broken away;

Fig. 4 is an enlarged end view of a cylindrical can body made from the blank shown in Fig. 1; and Fig. 5 is a greatly enlarged sectional view showing the adhesively secured side seam of the can body shown in Fig. 4 together with apparatus for pressing the seam parts together.

As a preferred or exemplary embodiment of the instant invention the drawings disclose the method steps of producing a lapped, adhesively bonded side seam A (Fig. 4) for a cylindrical can or container body B (Fig. 4) formed from a flat blank C (Fig. 1) having opposed side seam marginal edge portions D, E which are embodied in the side seam A to permanently hold the body together.

As an example of a can or container body having nonabsorbent surfaces to be bonded together in the side seam A, the flat blank C preferably is made of a fibrous material having secured to one face thereof (preferably the upper face as viewed in Fig. 1, which is the inner surface of the body as viewed in Fig. 4) a film G of gasproof, moistureproof and waterproof metallic foil such as aluminum foil. The reverse or under face of the blank C, which constitutes the exterior surface of the body B, preferably is coated with a film of gasproof, moistureproof and waterproof material H such as Saran (polyvinylidine chloride).

For bonding the side seam marginal edge portions D, E of the blank C together any suitable fluid or semi-fluid adhesive J (Figs. 4 and 5) dissolved in a suitable solvent to facilitate application of the adhesive to a surface, may be used. Such an adhesive may be of the character of the well known vinyl copolymer adhesives dissolved in solvents such as methyl ethyl ketone, toluol or other inflammable solvents.

In accordance with the method steps of the invention, a band, ribbon or stripe shaped film of the adhesive J is applied to the aluminum foil coated side of the side seam marginal edge portion D of the blank C as shown in Fig. 2. This band or stripe of adhesive J preferably extends for the full length of side seam edge portion and may be applied in any suitable manner, such as by extrusion from a nozzle 21 (Fig. 2).

While the adhesive J on the blank C is still wet, the volatile solvents are ignited or set afire as by application of a flame 22 which projects from a burner or flame thrower 23 (Fig. 3) having a shut off valve 24 for controlling the dimensions of the flame. The blank may be passed under the flame 22 or the flame passed over and along the adhesive as desired to effect this ignition of the solvents. In either case, the flame 22 is used as an igniter and not a mere heater. The flame 22 starts the burning of the solvents and the intense heat created by this burning action volatilizes the solvents remaining in the interior of the mass of the adhesive and causes them to rise to the surface and in turn become ignited so that through a progressive volatilizing and burning action the solvents are substantially and quickly eliminated from the adhesive and thereby are prevented from being subsequently trapped between the nonabsorbent surfaces in the side seam A. The intense heat created by the burning off of the solvents also reduces the residual material of the adhesive to a hot and extremely tacky condition.

While this flaming of the adhesive J is taking place, the opposite side seam marginal edge portion E preferably is heated to raise the temperature of this seam portion. This preferably is effected simultaneously with the flaming of the adhesive but may be effected before or after the flaming operation if desired. The heating of this seam portion E preferably is effected by passing the seam portion E of the blank over a gas burner 26 having a plurality of jets or flames 27 projecting therefrom or over any other suitable heater or, if desired, the burner or heater may be passed over the seam portion while the blank is held sationary.

While the side seam marginal edge portions D, E. and the residual material of the adhesive J on the edge portion D are still hot, the edge portions D, E are brought together in overlapping relation, with the hot tacky solvent free adhesive interposed between them and are momentarily pressed tightly together as shown in Fig. 5 to produce the side seam A. Pressing of the marginal edge portions together may be effected in any suitable manner, preferably by a pair of opposed members such as an anvil or spline 31 (Fig. 5) and a hammer 32 which constitute side seam bumping elements of a conventional can body making machine.

Upon pressing the overlapping edge portions D, E, together a strong bond is made between them instantaneously since there is substantially no solvent left in the adhesive and the side seam A is complete without the need of any further heating of the seam or any continued holding of the seam parts together, the bond being produced by a single hammer blow of momentary duration which along with the other steps of the method may be readily effected in a conventional can body making machine and under high speed production requirements.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of rapidly producing an adhesively bonded joint between non-absorbent surfaces that retard the escape of solvents in the adhesive, comprising the steps of applying to one of the surfaces to be incorporated in the joint an adhesive containing a volatile solvent to facilitate application of the adhesive to the surface, applying an open flame to said adhesive while relatively moving said flame and surface to ignite and remove quickly the volatile solvent from the freshly applied adhesive and simultaneously reduce the solvent free residual material of the adhesive to a hot tacky condition, and suddenly pressing together the surfaces to be incorporated in the joint with the tacky residual material of the adhesive interposed therebetween to effect a substantially instantaneous bonding of the surfaces together.

2. A method of the character defined in claim 1 wherein the opposing surface to be incorporated in said joint is free of adhesive and is preheated to facilitate rapid bonding together of the surfaces upon being pressed together.

3. A method of the character defined in claim 1 wherein said pressing together of the surfaces is of momentary duration imparted by a hammer blow.

4. A method of the character defined in claim 1 wherein the opposing surface to be incorporated in said joint is free of adhesive and is preheated simultaneously with the burning off of the solvents of the adhesive on the adhesive coated surface to facilitate rapid bonding together of said surfaces upon being pressed together.

5. A method of instantaneously producing an adhesively bonded joint between container body side seam marginal edge portions having nonabsorbent inner and outer surfaces that retard the escape of solvents in the adhesive, comprising the steps of preheating one of said marginal edge portions, applying to the other of said marginal edge portions an adhesive containing a volatile solvent to facilitate application of said adhesive to said edge portion, setting afire the volatile solvent in said freshly applied adhesive to remove said solvent therefrom and to heat the solvent free residual material of said adhesive to a hot tacky condition, overlapping said preheated edge portion and said adhesive carrying edge portion with the hot solvent free residual material of said adhesive interposed between them, and momentarily pressing said edge portions together to instantaneously bond them into a strong side seam for said container body.

6. A method of instantaneously producing an adhesively bonded lapped side seam in a fibre container body having non-absorbent inner and outer side seam surfaces tending to retard the escape of solvents present in the adhesive, comprising preheating one of said body side seam surfaces, applying to the other of said surfaces an adhesive containing a volatile solvent, applying an open flame to the freshly applied adhesive to ignite and remove said solvent therefrom while relatively moving said flame and surface and to heat the solvent free adhesive material to a hot tacky condition, overlapping said side seam surfaces with the hot adhesive material interposed therebetween, and then sharply bumping said overlapped surfaces to instantaneously bond them together in a strong impervious side seam for said container body.

References Cited in the file of this patent

UNITED STATES PATENTS

| | | |
|---|---|---|
| 2,196,579 | Reinhardt | Apr. 9, 1940 |
| 2,423,869 | Blessing | July 15, 1947 |
| 2,568,463 | Reynolds | Sept. 18, 1951 |
| 2,609,963 | Watson et al. | Sept. 9, 1952 |
| 2,623,444 | Maier et al. | Dec. 30, 1952 |